United States Patent
Glugla et al.

(10) Patent No.: US 10,760,514 B2
(45) Date of Patent: Sep. 1, 2020

(54) METHODS AND SYSTEM FOR OPERATING AN ENGINE

(71) Applicant: Ford Global Technologies, LLC, Dearborn, MI (US)

(72) Inventors: Christopher Paul Glugla, Macomb, MI (US); Gopichandra Surnilla, West Bloomfield, MI (US); Imtiaz Ali, Lathrup Village, MI (US); Lyth Alobiedat, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 22 days.

(21) Appl. No.: 15/835,153

(22) Filed: Dec. 7, 2017

(65) Prior Publication Data

US 2019/0178188 A1 Jun. 13, 2019

(51) Int. Cl.
| | | |
|---|---|---|
| *F02D 41/14* | (2006.01) | |
| *F02D 15/02* | (2006.01) | |
| *G01M 15/11* | (2006.01) | |
| *F02P 5/15* | (2006.01) | |

(52) U.S. Cl.
CPC ......... *F02D 41/1495* (2013.01); *F02D 15/02* (2013.01); *F02D 41/1498* (2013.01); *F02P 5/1512* (2013.01); *G01M 15/11* (2013.01); *F02D 2200/101* (2013.01); *F02D 2200/1015* (2013.01); *F02D 2700/03* (2013.01)

(58) Field of Classification Search
CPC ................ F02D 41/1495; F02D 15/02; F02D 2200/101; F02D 2200/1015
See application file for complete search history.

(56) References Cited

U.S. PATENT DOCUMENTS

| | | | |
|---|---|---|---|
| 7,158,875 B2 | 1/2007 | Yasui et al. | |
| 7,802,544 B2 | 9/2010 | Kamada | |
| 2015/0267625 A1 | 9/2015 | Kiyomura | |
| 2017/0370805 A1* | 12/2017 | Habens | ................ G01M 15/12 |
| 2018/0030906 A1* | 2/2018 | Sasaki | ..................... F02D 15/02 |
| 2018/0202355 A1* | 7/2018 | Hiyoshi | ................ F02B 75/04 |

FOREIGN PATENT DOCUMENTS

JP 2009057958 A 3/2009

\* cited by examiner

*Primary Examiner* — Lindsay M Low
*Assistant Examiner* — Ruben Picon-Feliciano
(74) *Attorney, Agent, or Firm* — Geoffrey Brumbaugh; McCoy Russell LLP

(57) ABSTRACT

Systems and methods for operating an engine that includes a compression ratio linkage for adjusting engine compression ratio are described. The systems and methods provide different ways of diagnosing the presence or absence of engine misfire in response to engine operating regions that may be more or less prone to torsional engine crankshaft vibration. In one example, engine misfire may be determined responsive to force applied to an engine compression ratio changing linkage.

19 Claims, 5 Drawing Sheets

METHODS AND SYSTEM FOR OPERATING AN ENGINE

FIELD

The present description relates to methods and a system for operating an internal combustion engine. The methods and systems may be particularly useful determining the presence or absence of engine misfire for an engine that has a compression ratio adjustment linkage.

BACKGROUND AND SUMMARY

An engine may misfire from time t0 time due to various operating conditions. For example, an engine may misfire in response to a lean engine air-fuel ratio. Further, the engine may misfire in response to improperly timed ignition spark. One way to determine whether or not the engine may have misfired may be by monitoring engine acceleration during an engine cycle. If engine acceleration during an engine cycle is less than a threshold, it may be judged that the engine has misfired. However, there may be some engine operating conditions where it may be difficult to assess whether or not an engine has misfired because the engine may exhibit torsional vibrations of the engine's crankshaft. If engine misfire is not determined during these engine operating conditions, engine torque output may decline and undesirable engine emissions may increase. Therefore, it would be desirable to provide a way of diagnosing the presence or absence of engine misfire over a wider range of engine operating conditions.

The inventors herein have recognized the above-mentioned issues and have developed an engine operating method, comprising: adjusting an engine actuator via a controller in response to engine misfire indicated from engine crankshaft position while operating an engine in a first operating region; and adjusting the engine actuator via the controller in response to engine misfire indicated from output of a sensor coupled to an engine compression ratio adjusting linkage while operating the engine in a second operating region.

By adjusting an engine actuator responsive to engine misfire indicated by engine crankshaft position and output of a sensor coupled to an engine compression ratio adjusting linkage, it may be possible to determine the presence and absence of engine misfire over a larger engine operating range (e.g., an engine speed and load range). For example, engine misfire may be determined from converting engine position into engine speed and differentiating engine speed to determine engine acceleration during engine operating conditions when engine crankshaft torsional vibrations are low. Further, engine misfire may be determined from output of a sensor coupled to an engine compression ratio changing linkage during engine operating conditions when crankshaft torsional vibrations are high. The engine compression ratio changing linkage sensor output may provide a better signal to noise ratio than an engine crankshaft position sensor during some engine operating conditions, and the engine crankshaft position sensor may provide a better signal to noise ratio than the engine compression ratio changing linkage sensor output during other engine operating conditions.

The present description may provide several advantages. Specifically, the approach may provide improved engine misfire detection and mitigation. In addition, the approach may suspend or change methods for determining engine misfire during conditions where one engine misfire detection method may be less reliable. Further, the approach may improve engine emissions and torque production if an engine misfire occurs.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

The present description is related to operating a variable compression ratio engine and determining the presence or absence of engine misfire (e.g., lack of combustion in the cylinder or where less than a threshold amount (15%) of an air-fuel mixture in a cylinder combusts during a cycle of the cylinder). The engine may be of the type shown in FIG. 1 or it may be a diesel engine. The engine may include one or more cylinder compression ratio changing linkages as shown in FIGS. 2A and 2B. The engine may be operated according to the method of FIG. 4 to provide the operating sequence shown in FIG. 3. Engine misfire detection methods may be invoked in response to engine operating conditions as shown in FIG. 5.

Figure 1:
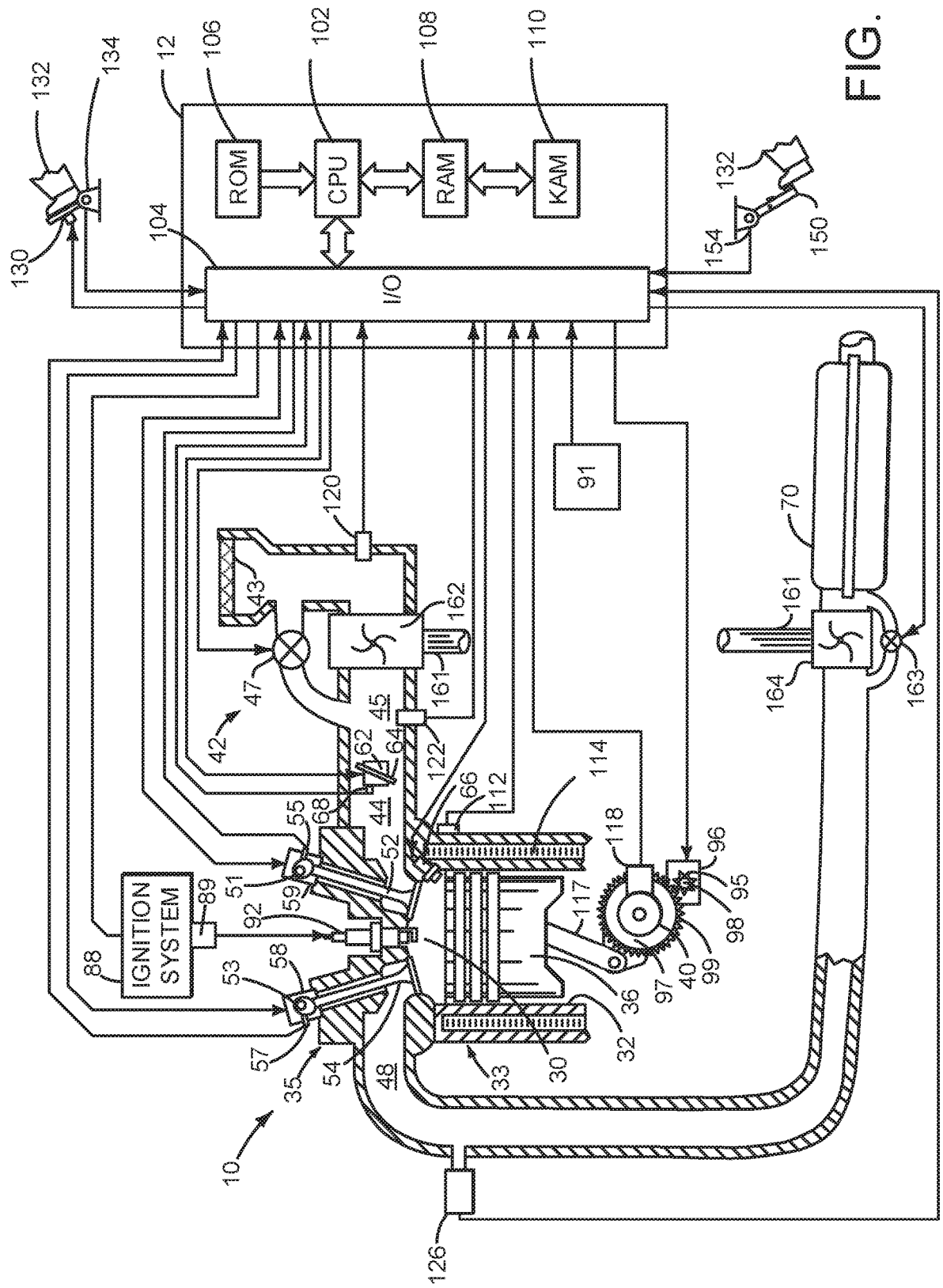
FIG. 1 is a schematic diagram of an engine.
Figure 2A:
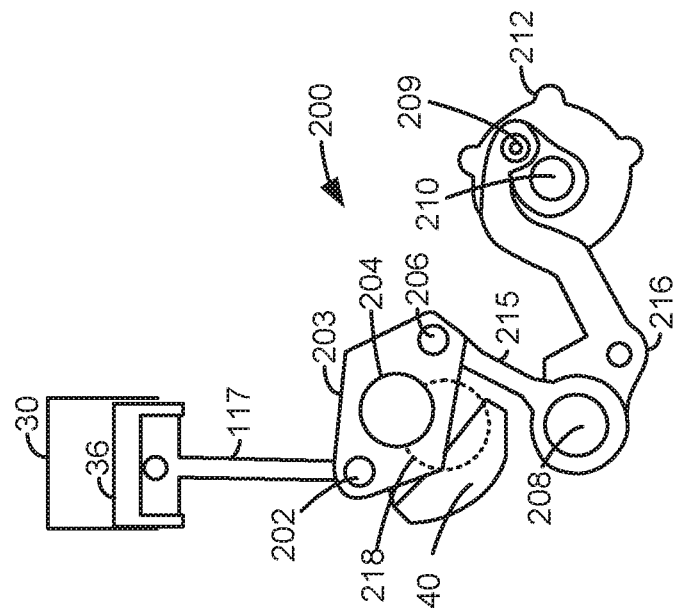
FIGS. 2A and 2B show an engine compression ratio changing linkage in two positions.
Figure 2B:
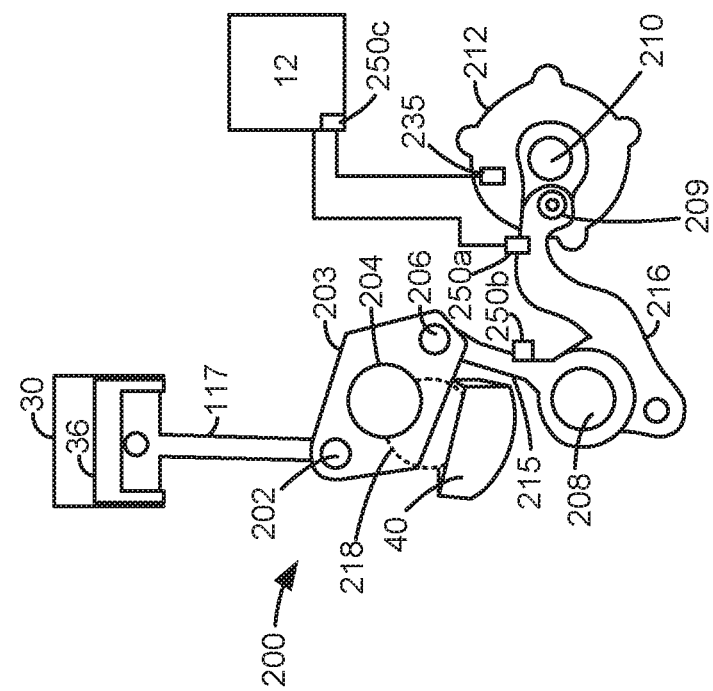

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and it reciprocates with rod 117 via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when it is not engaged to the engine crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via ignition coil 89 and spark plug 92 in response to controller 12 spark timing signals. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Engine torque may be adjusted via adjusting spark timing, fuel amount supplied via the fuel injectors, fuel timing, throttle plate position, intake and exhaust valve timing, boost pressure, spark energy, and the amount of air supplied to the engine. Thus, engine torque may be adjusted via adjusting operation of actuators such as ignition coil 89, a position of throttle 62, a position of waste gate 163, a position of compressor recirculation valve 47, intake valve activation device 59, and exhaust valve activation device 58.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human foot 132; a position sensor 154 coupled to brake pedal 150 for sensing force applied by human foot 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined. Further, controller 12 may communicate with human/machine interface 91 to indicate status of diagnostics and provide feedback to vehicle occupants.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIGS. 2A and 2B show a cylinder compression ratio changing linkage that changes a compression ratio of an engine. FIG. 2A shows compression ratio changing linkage 200 in a first position that increases a compression ratio of cylinder 30. FIG. 2B shows compression ratio changing linkage 200 in a second position that decreases a compression ratio of cylinder 30. Controller 12 may include non-transitory executable instructions to operate the cylinder compression ratio changing linkage at the positions shown and other positions to adjust the engine's compression ratio.

Connecting rod 117 is shown mechanically coupled to upper link 203 via connecting pin 202. Upper link 203 is coupled to crankpin 204 and crankpin 204 is part of crankshaft 40. Crank journal 218 is supported via engine block 33 and crankpin 204 is offset from crank journal 218. Upper link 203 is mechanically coupled to lower link 215 via connecting pin 206. Lower link 215 is mechanically coupled to control link 216 via connecting pin 208. Motor 212 is mechanically coupled to control link 216 via connecting pin 209. Shaft 210 of motor 212 may selectively rotate clockwise or counter clockwise to advance or retract control link 216. Controller 12 may selectively supply electric current to motor 212 and electric current may be monitored via current sensor 250c. Current that is supplied to motor 212 to maintain a position of control link 216 may be indicative of force applied to rod 117 since rod 117 is mechanically coupled to control link 216. Thus, motor 212 may be applied as a force sensor coupled to control link 216. In some examples, strain gauge 250b may be mechanically coupled to lower control line 215 to determine force applied to rod 117. Alternatively, strain gauge 250a may be mechanically coupled to control link 216 to determine force applied to rod 117.

FIG. 2A shows control link 216 in an extended state via motor shaft 210 rotating counter clockwise, which causes upper link 203 to rotate, thereby changing an angle between rod 117 and upper link 203. FIG. 2B shows control link 216 in a retracted state via motor shaft 210 rotating clockwise, which causes upper link 203 to rotate and change the angle between rod 117 and upper link 203. FIG. 2A shows compression ratio changing linkage 200 in a high compression state (e.g., 12:1 compression ratio) and FIG. 2B shows compression ratio changing linkage 200 in a low compression state (e.g., 8:1 compression ratio).

Thus, the system of FIGS. 1-2B provides for a vehicle system, comprising: an engine including a crankshaft position sensor, a compression ratio adjustment linkage, and a sensor coupled to the compression ratio adjustment linkage; an actuator coupled to the engine; and a controller including executable instructions stored in non-transitory memory to diagnose engine misfire responsive to crankshaft position while operating the engine in a low torsional vibration engine operating range and to diagnose engine misfire responsive to force applied to the compression ratio adjustment linkage while operating the engine in a high torsional vibration engine operating range. The system includes where diagnosing engine misfire responsive to force applied to the compression ratio adjustment linkage includes judging misfire in response to a maximum force applied to the compression ratio adjustment linkage occurring within a predetermined crankshaft angle range of top-dead-center compression stroke of a cylinder during a cycle of the cylinder. The system further comprises not diagnosing engine misfire responsive to force applied to the compression ratio adjustment linkage when the controller adjusts a compression ratio of the engine. The system further comprises additional instructions to adjust the actuator in response to diagnosing misfire (e.g., determining the presence of misfire in an engine cylinder) of a cylinder in the engine. The system includes where the actuator is an ignition coil. The system includes where the actuator is a fuel injector.

Figure 3:
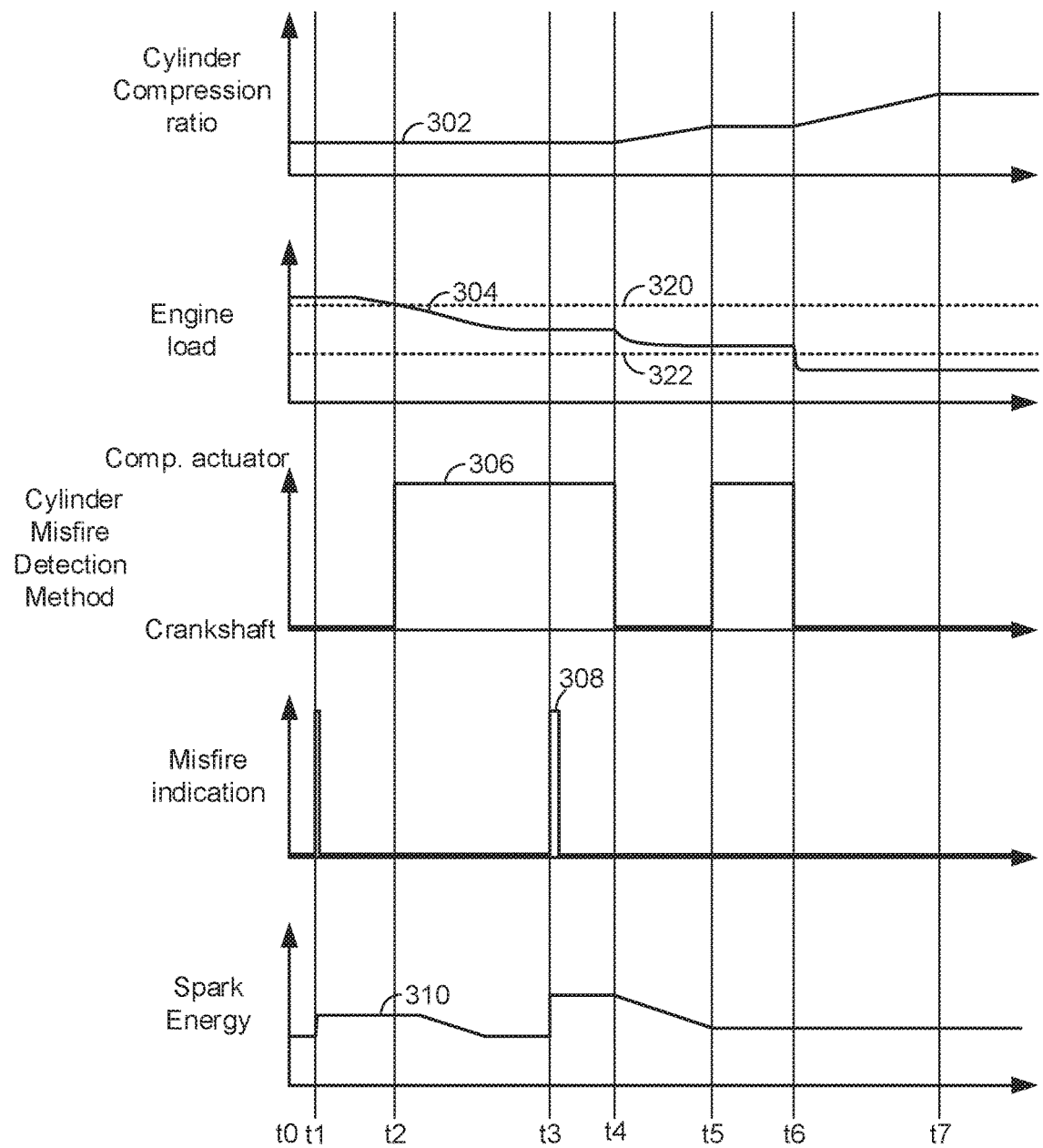
FIG. 3 is a plot that shows an example engine operating sequence according to the method of FIG. 4.

Referring now to FIG. 3, plot showing a prophetic cylinder misfire detection sequence is shown. The sequence of FIG. 3 may be provided via the system of FIGS. 1 and 2 in cooperation with the method of FIG. 4. The plots of FIG. 3 are time aligned and they occur at the same time. Vertical lines at time t0-t7 represent times of interest in the sequence. Controller 12 may include non-transitory executable instructions to operate the engine at the conditions shown and discussed in the description of FIG. 3.

The first plot of FIG. 3 is a plot of cylinder compression ratio versus time. The vertical axis represents cylinder compression ratio and the cylinder compression ratio increases in the direction of the vertical axis arrow. The horizontal axis represents time and time increases from the left side of the figure to the right side of the figure. Curve 302 represents cylinder compression ratio.

The second plot of FIG. 3 is a plot of engine load versus time. The vertical axis represents engine load and engine load increases in the direction of the vertical axis arrow. Trace 304 represents engine load. Engine load may be represented as a value that ranges from 0 to 1, where 0 is no engine load and 1 is full engine load. The horizontal axis represents time and time increases from the left side of the figure to the right side of the figure. Horizontal line 322 represents a lower first engine load. Horizontal line 320 represents a higher second engine load threshold. Engine misfire is determined via engine position and speed measurements when engine load is greater than the level of horizontal line 322 or less than the level of horizontal line 320. Engine misfire is determined via force applied to an engine compression ratio changing linkage when engine load is at a load between the engine loads represented by horizontal line 320 and horizontal line 322.

The third plot of FIG. 3 is a plot of cylinder misfire detection method versus time. The vertical axis represents cylinder misfire detection method, and the cylinder misfire detection method is via engine crankshaft acceleration when trace 306 is at a lower level near the horizontal axis. The cylinder misfire detection method detects engine misfire via the engine compression ratio changing linkage when trace 306 is at a higher level near the vertical axis arrow. Trace 306 represents cylinder misfire detection method. The horizontal axis represents time and time increases from the left side of the figure to the right side of the figure.

The fourth plot of FIG. 3 is a plot of engine misfire indication versus time. The vertical axis represents engine misfire indication and engine misfire is indicated when trace 308 is at a higher level near the vertical axis arrow. Engine misfire is not indicated when trace 308 is at a lower level near the horizontal axis. Trace 308 represents engine misfire. The horizontal axis represents time and time increases from the left side of the figure to the right side of the figure. Certain mitigating actions may be taken of misfire is indicated. For example, the engine air-fuel ratio may be enrichened, spark timing may be adjusted (e.g., retarded), and the amount of spark energy may be increased as indicated in the fifth plot.

The fifth plot of FIG. 3 is a plot of spark energy supplied to engine cylinders versus time. The vertical axis represents spark energy and spark energy increases in the direction of the vertical axis arrow. The spark energy is zero at the level of the horizontal axis. Trace 310 represents spark energy amount provided to engine cylinders. The horizontal axis represents time and time increases from the left side of the figure to the right side of the figure.

At time t0, the engine is operating (e.g., combusting air and fuel) at a high load and the engine compression ratio is at a lower level. Engine misfire detection is based on crankshaft acceleration and engine misfire is not indicated. In other words, the presence or absence of engine misfire is determined from engine acceleration. Spark energy supplied to engine cylinders is at a lower level. At time t1, engine misfire is indicated from engine acceleration. Engine misfire may be indicted in response to engine acceleration being less than a threshold amount or level. The amount of spark energy (e.g., joules) provided to engine cylinders is increased in response to the indication of engine misfire. Engine spark energy may be increased to all engine cylinders or engine spark energy may be increased only to the engine cylinder, or engine cylinders, in which misfire is detected. The engine load is at a higher level above threshold 320. Therefore, engine misfire detection is performed via engine crankshaft acceleration.

At time t2, engine load is reduced to less than threshold 320 so the cylinder misfire detection method is switched from crankshaft acceleration based engine misfire detection to engine compression ratio changing linkage based engine misfire detection. The engine load may be reduced in response to a reduction in driver demand torque (e.g., a partial release of the accelerator pedal). The amount of spark energy supplied to engine cylinders remains at its previous level and engine misfire is not indicated. Between time t2 and time t3, engine load is reduced further and the amount of spark energy supplied to engine cylinders is reduced in response to the change in engine operating conditions. Engine misfire is not indicated and the engine compression ratio remains constant at a lower level.

At time t3, engine misfire is indicated via detecting engine misfire based on the engine compression ratio changing linkage. In one example, described in greater detail in the description of the method of FIG. 4, engine misfire may be detected responsive to motor current supplied to hold the engine compression ratio changing linkage in a particular position that provides a particular engine compression ratio. If current supplied to motor 212 for a cylinder cycle is greatest at top-dead-center compression stroke of the cylinder, then it may be judged that the cylinder has misfired because the highest motor current being near top-dead-center compression stroke of the cylinder indicates that greatest pressure in the cylinder during the cylinder cycle is due to compression of gas in the cylinder, not combustion in the cylinder, which may increase pressure in the cylinder significantly more than compression. In other words, if a force measured by current supplied to motor 212, when a piston of a cylinder is within a predetermined crankshaft angle range of top-dead-center of a compression stroke of the cylinder (e.g., within ±2 crankshaft degrees), is greater than a force measured by current supplied to the motor to maintain the engine compression ratio changing linkage position at other crankshaft angles of the cylinder cycle, then it may be judged that the cylinder has misfired. The spark energy provided to engine cylinders is increased in response to the indication of engine misfire. By increasing the amount of spark energy provided to engine cylinders, the engine's tolerance to lean air-fuel mixtures may be improved such that the possibility of engine misfire may be reduced. The engine load remains between first threshold 322 and second threshold 320. The engine compression ratio remains at a lower level.

At time t4, the engine load is reduced further by the vehicle's driver partially releasing the accelerator pedal (not shown). The cylinder compression ratio is increased in response to the reduced engine load so that engine efficiency may be increased. The engine misfire detection mode changes to detect engine misfire via engine crankshaft acceleration. Engine misfire is not detected via the engine compression ratio changing linkage while the engine compression ratio is changing since changing the engine compression ratio may make engine misfire evaluation via the engine compression ratio changing linkage less reliable. Between time t4, and time t5, engine misfire is not detected and engine spark energy is being reduced in response to the change in engine operating conditions.

At time t5, the engine compression ratio stabilizes at a middle level and the cylinder misfire detection method switches back to detecting engine misfire via the engine compression ratio changing linkage because the engine compression ratio is not changing and because engine load is greater than first threshold 322. Between time t5 and time t6, engine misfire is not detected and spark energy supplied to engine cylinders remains at a middle level. The engine remains at these conditions until time t6 when engine load is reduced again in response to the vehicle driver partially releasing the accelerator pedal. The cylinder misfire detection method switches to engine misfire detection via engine crankshaft acceleration in response to the engine compression ratio changing. The engine compression ratio begins to change in response to the engine being at a lower load. Between time t6 and time t7, engine misfire is not detected and spark energy supplied to engine cylinders remains at a middle level.

At time t7, the cylinder misfire detection method remains the engine crankshaft acceleration method in response to engine load being less than threshold 322. The engine remains at a low load and engine misfire is not detected. The engine spark energy remains at a middle level.

In this way, the method for detecting engine misfire may be changed responsive to engine operating regions where crankshaft torsional vibrations may be greater than is desired. Further, the engine misfire detection method may be changed or switched off in response to changing the engine compression ratio so that the possibility of false misfire detection may be reduced.

Figure 4:
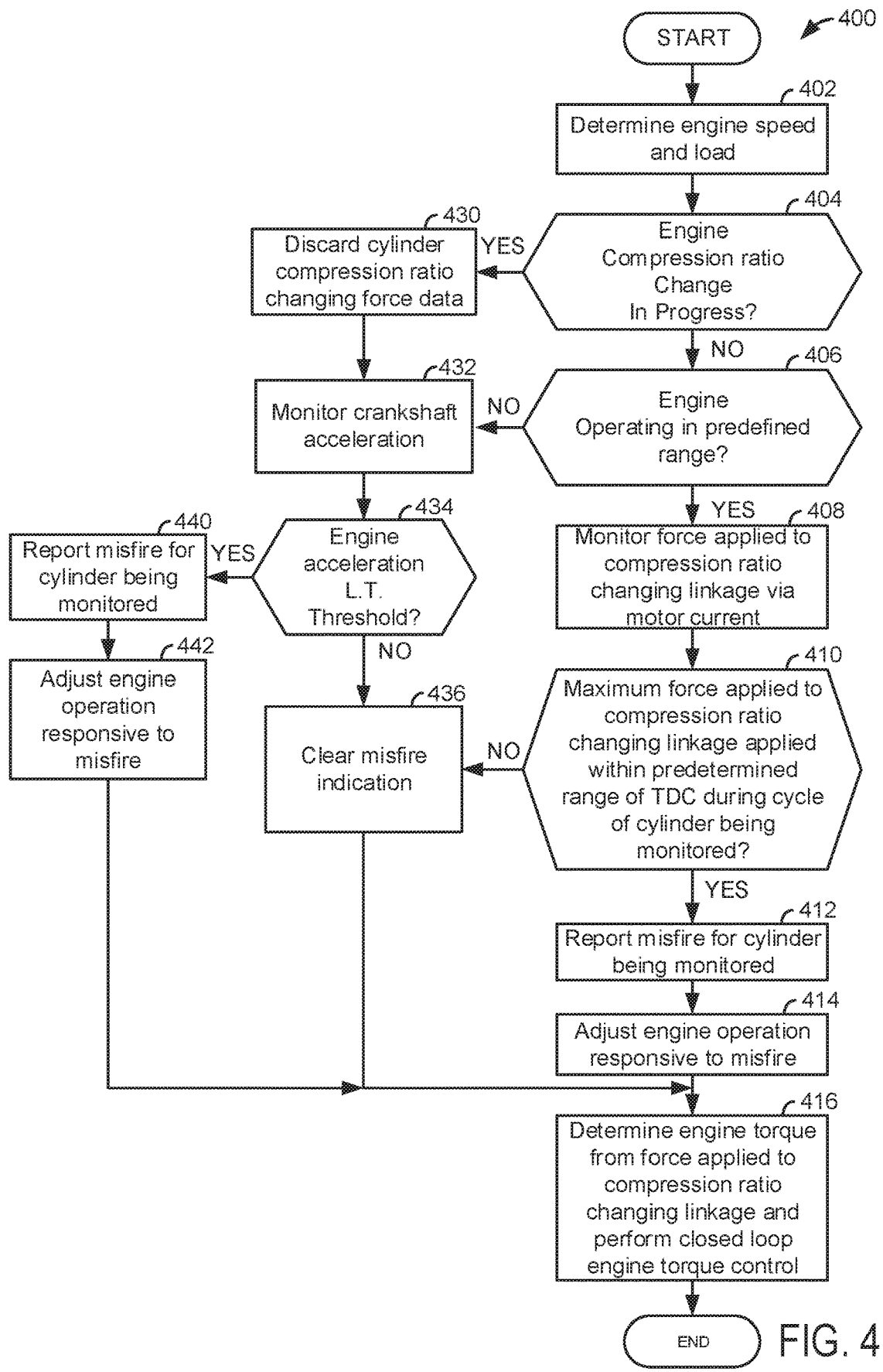
FIG. 4 is a method for operating an engine.
Figure 5:
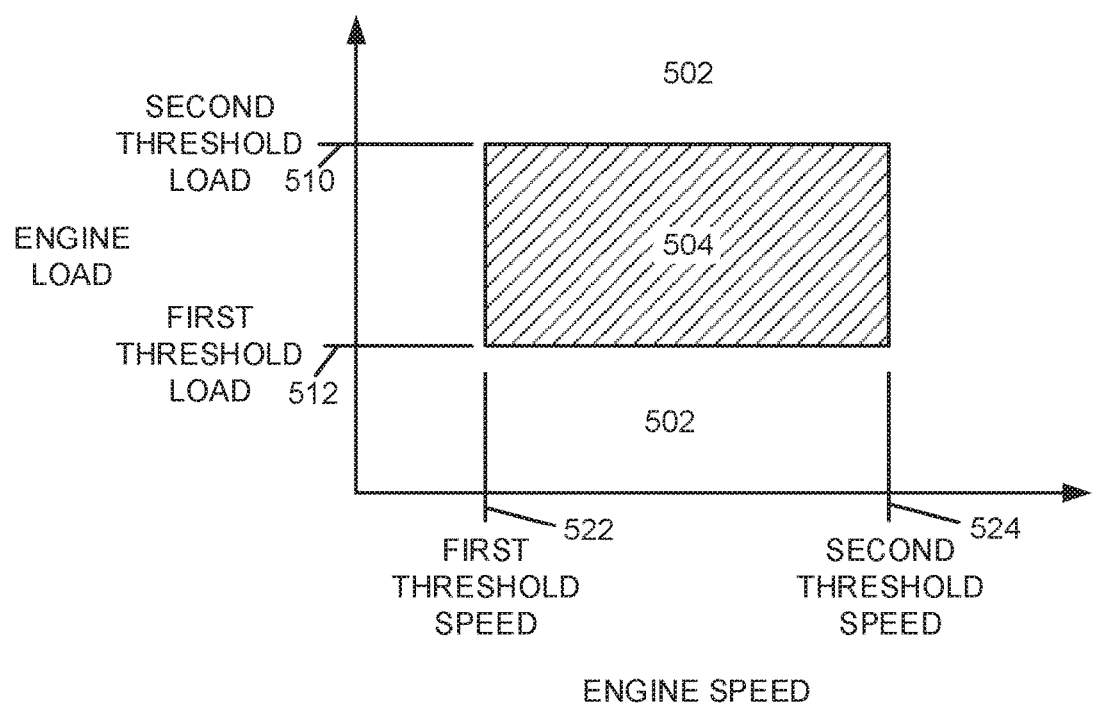
FIG. 5 shows a plot of example engine operating ranges where engine misfires may be detected.

Referring now to FIG. 4, a flowchart for operating an engine is shown. At least portions of the method of FIG. 4 may be incorporated as executable instructions stored in non-transitory memory of the system shown in FIGS. 1 and 2. Additionally, portions of the method of FIG. 4 may take place in the physical world as operations or actions performed by a controller to transform an operating state of one or more devices. Some of the control parameters described herein may be determined via receiving input from the sensors and actuators described herein. The method of FIG. 4 may also provide the operating sequence shown in FIG. 3. Further, the engine may be operated at the conditions mentioned in method 400. The engine controller may also include executable instructions stored in non-transitory memory to operate the engine at the conditions mentioned in method 400.

At 402, method 400 determines engine operating conditions. Engine operating conditions may include engine speed engine load, engine rate of acceleration, engine position, ambient temperature, engine temperature, force applied to an engine compression changing linkage, and driver demand torque. Engine position may be determined via an engine position sensor and engine speed may be determined from engine position. For example, engine speed may be determined by dividing the angular distance traveled by the engine from a first engine position to a second engine position by the amount of time it takes the engine to rotate from the first engine position to the second engine position. Engine rate of acceleration may be determined via differentiating the engine speed. Engine load may be determined by dividing the present engine air flow amount by a theoretical maximum engine air amount. Force applied to the engine compression ratio changing linkage may be determined from strain gauge sensor output or from motor current via converting strain gauge output or motor current to force values via a function or lookup table. Other engine operating conditions may be determined via receiving data from the various engine sensors. Method 400 proceeds to 404.

At 404, method 400 judges whether or not an engine compression ratio change is presently in progress. An engine compression ratio change may be performed via rotating motor 212 and adjusting a position of an engine compression ratio changing linkage as discussed with regard to FIGS. 2A and 2B. Method 400 may judge that an engine compression ratio change is in progress if controller 12 is commanding a motor 212 to change a position of control linkage 216. Alternatively, method 400 may judge that the engine compression ratio change is in progress if motor 212 is rotating. If method 400 judges that an engine compression ratio change is in progress, the answer is yes and method 400 proceeds to 430. Otherwise, the answer is no and method 400 proceeds to 406.

At 430, method 400 disregards and/or discards engine cylinder compression ratio changing linkage force data. The engine cylinder compression ratio changing linkage force data may be provided via a strain gauge that is mechanically coupled to the engine cylinder compression ratio changing linkage or it may be an amount of electrical current supplied to motor 212 to maintain a position of the engine cylinder compression ratio changing linkage. If the data is provided via a strain gauge, output of the strain gauge may be converted into a force. The force may be indicative of pressure in the engine cylinder during a cycle of a cylinder having a compression ratio that is adjustable via the engine cylinder compression ratio changing linkage. The strain gauge output may be input to a function and the function outputs a force that is proportionate to or equal to a force applied to the piston of the cylinder having a compression ratio that may be adjusted via the engine cylinder compression ratio changing linkage. The values in the function may be empirically determined and stored in controller memory.

On the other hand, position of motor 212 may be closed loop controlled to a desired position that provides a desired compression ratio of an engine cylinder. Electric current supplied to motor 212 may be continuously adjusted to maintain the desired compression ratio whether the desired compression ratio is a constant or changing value. The current supplied to maintain the position of the engine cylinder compression ratio changing linkage may be indicative or force applied to a piston of a cylinder having a compression ratio that may be adjusted via the engine cylinder compression ratio changing linkage. Current supplied to motor 212 to maintain the position of the engine cylinder compression ratio changing linkage may be converted to a force that is applied to the piston of the cylinder via a function that has inputs comprising motor current and engine cylinder compression ratio changing linkage position. The function outputs a force value and the force value may be indicative of cylinder pressure. The cylinder pressure may be indicative of whether or not misfire occurs in the cylinder during a cycle of the cylinder. However, since the engine compression ratio changing linkage is moving to a different position, data output from sensors that are in electrical or mechanical communication with the engine compression ratio changing linkage may be less reliable. As such, engine compression ratio changing linkage sensor data may be disregarded and/or discarded. Method 400 proceeds to 432.

At 432, method 400 monitors engine crankshaft acceleration. Method 400 monitors engine crankshaft acceleration and judges the presence or absence of cylinder misfire according to engine crankshaft acceleration.

Engine crankshaft acceleration may be determined over a complete engine cycle (e.g., two revolutions for a four stroke engine), or alternatively, method 400 may determine engine crankshaft acceleration only during predetermined engine crankshaft angular regions. For example, for cylinder number one, method 400 may monitor engine crankshaft acceleration in a crankshaft angular region extending from 10 degrees before top-dead-center compression stroke of cylinder number one to 90 crankshaft degrees after top-dead-center compression stroke of cylinder number one. Method 400 may also monitor engine acceleration during similar crankshaft angular regions for the engine's other cylinders (e.g., cylinders 2-4). Method 400 may determine engine acceleration via differentiating engine speed. Method 400 stores the engine acceleration data to controller memory and proceeds to 434.

At 434, method 400 judges whether or not engine acceleration within a predetermined crankshaft angular region corresponding to a particular engine cylinder is less than a threshold engine acceleration. If so, the answer is yes and method 400 proceeds to 440. Otherwise, the answer is no and method 400 proceeds to 436.

Engine acceleration that is less than a threshold engine acceleration during a predetermined crankshaft angular region for a particular engine cylinder may be indicative of misfire in the engine cylinder. For example, if engine acceleration in the crankshaft angular region extending from 10 degrees before top-dead-center compression stroke of cylinder number one to 90 crankshaft degrees after top-dead-center compression stroke of cylinder number one is less than X crankshaft degrees/sec$^2$, then there may be a misfire in cylinder number one. Engine angular acceleration greater than X crankshaft degrees/sec$^2$ may be indicative of the absence of misfire in the engine cylinder. The threshold engine acceleration value may be empirically determined and stored in controller memory. In one example, the threshold engine acceleration value may be determined via operating the engine on a dynamometer and determining difference in engine acceleration values when no misfire is present and when one or more engine cylinders misfire.

At 436, method 400 clears an indication of cylinder misfire in controller memory. In one example, a bit or word of controller memory may hold a value that is indicative of whether or not misfire in a particular engine cylinder was detected during a previous engine cycle. Method 400 clears the value of the memory location so that misfire for the particular engine cylinder is no longer indicated after misfire in the cylinder is not detected during a cycle of the cylinder. Variables that store cylinder misfire state for each cylinder may be cleared if misfire is not detected in each of the engine's cylinders. Method 400 proceeds to 416.

At 440, method 400 records to memory and reports engine misfire for the cylinder where engine acceleration was less than the threshold engine acceleration during a predetermined crankshaft angular region for the engine cylinder. Engine misfire may be reported to a human/machine interface (e.g., a display panel, light, or other human/machine interface) to provide an indication of engine misfire to vehicle occupants. Further, the indication of engine misfire may be stored in memory to provide a history of engine misfire. Method 400 proceeds to 442.

At 442, method 400 adjusts engine operation in response to engine misfire. Method 400 adjusts one or more actuators responsive to engine misfire. In one example, method 400 increases spark energy via increasing a dwell time that voltage is supplied to an ignition coil to increase an amount of energy provided via spark to the engine cylinder in which misfire is indicated. By increasing the dwell (e.g., duration) time of voltage applied to the ignition coil, charge stored in the ignition coil is increased and the increased charge stored in the ignition coil is delivered to a cylinder to ignite the air-fuel mixture in the cylinder. Additional spark energy may improve the engine's tolerance for lean combustion. In addition, method 400 may increase an amount of fuel supplied to the engine in response to an indication of misfire, especially if the engine air-fuel ratio is indicated as being lean via the engine's oxygen sensor. Method 400 proceeds to 416 after adjusting engine actuators responsive to engine misfire.

At 406, method 400 judges whether or not the engine is operating within a predetermined engine operating range. In one example, method 400 may judge if engine load is greater than a first engine load and less than a second engine load. Further, in some examples, method 400 may judge if engine speed is greater than a first engine speed and less than a second engine speed. In one example, the predetermined engine operating range may be as shown if FIG. 5. However, the predetermined engine operating range may be comprised of operating regions different than those shown in FIG. 5. Further, there may be plurality engine operating regions that are included in the predetermined engine operating range. Method 400 may judge whether or not the engine is within the predetermined operating range via receiving input from engine position and air flow sensors. If method 400 judges that the engine is operating within a predetermined operating range, the answer is yes and method 400 proceeds to 408. Otherwise, the answer is no and method 400 proceeds to 432.

At 408, method 400 monitors force applied to the engine compression ratio changing linkage via current supplied to motor 212 or a sensor that is mechanically coupled to the engine compression ratio changing linkage. In one example, method 400 monitors electrical current supplied to motor 212 to maintain the position of the engine compression ratio changing linkage. The amount of current supplied to the motor is converted to a force applied to the piston via an empirically determined function that is referenced via motor current and engine compression ratio changing linkage position. If force applied to the engine compression ratio changing linkage is determined via a strain gauge, a function referenced by strain gauge output and engine compression ratio changing linkage position outputs a force applied to a piston having a compression ratio that is adjustable via the engine compression ratio changing linkage. The force applied to the cylinder piston may be a force applied to the cylinder piston over a predetermined crankshaft angle range of the piston. For example, if force applied to the piston of cylinder number one is being determined, the force applied to the piston of cylinder number one may be determined for a crankshaft angle region between ten crankshaft degrees before top-dead-center compression stroke of cylinder number one to 90 degrees after top-dead-center cylinder number one compression stroke. Note that the crankshaft angle regions described herein are only exemplary in nature and are not to be considered as limiting of the disclosure. Method 400 proceeds to 410.

At 410, method 400 judges if the maximum force applied to the engine compression ratio changing linkage, which is a function of the maximum force applied to the cylinder piston, for the predetermined crankshaft angular region of the cylinder being monitored is within a predetermined crankshaft angular range of top-dead-center (TDC) compression stroke of the cylinder being monitored. If so, the answer is yes and method 400 proceeds to 412. Otherwise, the answer is no and method 400 proceeds to 436.

If a misfire occurs within a cylinder being monitored, pressure in the cylinder during a cycle of the cylinder may be greatest near top-dead-center compression stroke of the cylinder since pressure in the cylinder from combustion may be non-existent during the cylinder cycle. The force that the pressure in the cylinder exerts on the piston may be transferred to the engine compression ratio changing linkage since the engine compression ratio changing linkage is mechanically coupled to the cylinder's piston. Thus, when a misfire in a cylinder occurs during a cycle of a cylinder, greatest pressure in the cylinder during the cycle of the cylinder may be at or within +2 crankshaft degrees of top-dead-center compression stroke of the cylinder. The actual cylinder pressure at top-dead-center compression stroke of the cylinder may be a function of air flow into the cylinder during the cylinder cycle. However, if combustion occurs within the engine cylinder, the greatest pressure may be exerted on the piston after top-dead-center compression stroke of the cylinder (e.g., 15 crankshaft degrees after top-dead-center compression stroke of the cylinder). Thus, if peak cylinder pressure and maximum force applied to the engine compression changing linkage during the cylinder cycle is near top-dead-center compression stroke of the cylinder, it may be determined that a misfire of the cylinder has occurred during the cylinder cycle. On the other hand, it may be determined that a misfire has not occurred in the cylinder if maximum cylinder pressure and/or maximum force applied to the engine compression ratio changing linkage is not at top-dead-center compression stroke of the cylinder. Said in a different way, if force applied to the engine compression ratio changing linkage at top-dead-center compression stroke of a cylinder during a cylinder cycle is greater than force applied to the engine compression ratio changing linkage at crankshaft angles other than top-dead-center compression stroke of the cylinder during the cylinder cycle (e.g., crankshaft angles more than +2 crankshaft degrees away from top-dead-center compression stroke of the cylinder), it may be judged that a misfire in the cylinder has occurred during the cylinder cycle. However, if force applied to the engine compression ratio changing linkage at top-dead-center compression stroke of a cylinder during a cylinder cycle is less than force applied to the engine compression ratio changing linkage at a crankshaft angle other than top-dead-center compression stroke of the cylinder during the cylinder cycle, it may be judged that a misfire in the cylinder has not occurred during the cylinder cycle.

At 412, method 400 reports a cylinder misfire. A cylinder misfire may be reported to vehicle occupants via a human/machine interface. Further, a cylinder misfire may be reported by changing a value of a variable stored in controller memory. The misfire indication may be communicated to a remote computer or it may be stored in controller memory in a vehicle history file. Method 400 proceeds to 414.

At 414, method 400 adjusts engine operation in response to engine misfire. Method 400 adjusts one or more actuators responsive to engine misfire. In one example, method 400 increases spark energy via increasing a dwell time that voltage is supplied to an ignition coil to increase an amount of energy provided via spark to the engine cylinder in which misfire is indicated. By increasing the dwell (e.g., duration) time of voltage applied to the ignition coil, charge stored in the ignition coil is increased and the increased charge stored in the ignition coil is delivered to a cylinder to ignite the air-fuel mixture in the cylinder. Additional spark energy may improve the engine's tolerance for lean combustion. In addition, method 400 may increase an amount of fuel supplied to the engine in response to an indication of misfire, especially if the engine air-fuel ratio is indicated as being lean via the engine's oxygen sensor. Method 400 proceeds to 416 after adjusting engine actuators responsive to engine misfire.

At 416, method 400 estimates engine torque from force applied to the engine compression ratio changing linkage. As previously discussed, the engine compression ratio changing linkage is mechanically coupled to one or more engine pistons. Consequently, force applied to the engine compression ratio changing linkage may be indicative of engine torque during an engine cycle. The engine compression ratio changing linkage may be held in place via current supplied to a motor, and the current supplied to the motor may be indicative of force applied to the engine compression ratio changing linkage because the linkage is mechanically coupled to one or more engine pistons and the current to hold the linkage in place may be proportionate to the force applied to the linkage via the piston. The force applied to the piston may be indicative of engine torque production. Alternatively, output of a strain gauge coupled to the engine compression ratio changing linkage may be indicative of engine torque since force applied to the engine compression ratio changing linkage may be indicative of cylinder pressure and engine torque. Thus, motor current or strain gauge output may be converted into an estimated engine torque. For example, motor torque and engine compression ratio changing linkage position may be input to a function that outputs an estimate of engine torque. The estimates of engine torque may be empirically determined via operating the engine on a dynamometer and monitoring engine compression ratio changing motor current, engine compression ratio changing linkage position, and engine torque. Alternatively, engine compression ratio changing linkage strain gauge output and engine compression ratio changing linkage position may be input to a function that outputs an estimate of engine torque. The estimates of engine torque may be empirically determined via operating the engine on a dynamometer and monitoring engine compression ratio changing linkage strain gauge output, engine compression ratio changing linkage position, and engine torque. The torque estimate values may be a basis for providing closed loop control of engine torque. Method 400 proceeds to exit.

In this way, method 400 may judge the presence or absence of engine misfire. Engine misfire may be determined from engine crankshaft acceleration during some conditions and from engine compression ratio linkage during other conditions. The sensor signals from the engine compression ratio linkage may provide an improved basis for engine misfire detection during some engine operating conditions, such as when engine torsional vibration may be present.

Thus, the method of FIG. 4 provides for an engine operating method, comprising: adjusting an engine actuator via a controller in response to engine misfire indicated from engine crankshaft position while operating an engine in a first operating region; and adjusting the engine actuator via the controller in response to engine misfire indicated from output of a sensor coupled to an engine compression ratio adjusting linkage while operating the engine in a second operating region. The method includes where the engine is operated in the first operating region and in the second operating region. The method further comprises determining the engine misfire in response to a force measured via the sensor being greatest during a cylinder cycle within a predetermined crankshaft angle of top-dead-center compression stroke of a cylinder during the cylinder cycle, and where the predetermined crankshaft angle varies as a function of engine compression ratio. The method includes where the first operating region includes engine load less than a first threshold engine load. The method includes where the first operating region includes engine load greater than a second threshold. The method further comprises adjusting a compression ratio of an engine via the engine compression ratio adjusting linkage and disregarding output of the sensor for purposes of determining engine misfire while adjusting the compression ratio of the engine. The method includes where the engine actuator is an ignition coil, and further comprising: adjusting spark energy provided via the ignition coil in response to engine misfire indicated from engine crankshaft position and engine misfire indicated from the output of the sensor.

The method of FIG. 4 also provides for an engine operating method, comprising: adjusting a compression ratio of a cylinder via adjusting a position of a control linkage in response to output of a controller; receiving input from a sensor positioned along the control linkage to the controller; and adjusting an engine actuator responsive to engine misfire determined from output of the sensor when the controller is not adjusting the compression ratio and not adjusting the engine actuator responsive to output of the sensor when the controller is adjusting the compression ratio. In other words, engine misfire may be determined via the sensor only when the compression ratio of the engine is not being adjusted. Likewise, engine misfire may be determined via current supplied to the motor that adjusts the engine compression ratio changing linkage only when the engine compression ratio is not changing. The method includes where the sensor is a strain gauge, and where the control linkage extends from a motor to an engine piston. The method further comprises adjusting the engine actuator responsive to output of the sensor, the output of the sensor determined within a predetermined crankshaft angular range. The method includes where the engine actuator is an ignition coil. The method further comprises increasing spark energy via increasing a dwell time of the ignition coil. The method further comprises determining a presence or absence of engine misfire via determining a crankshaft angle during a cylinder cycle where force applied to the control linkage is greatest. The method further comprises determining a presence of misfire in response to the crankshaft angle being within a predetermined crankshaft angle range of top-dead-center compression stroke of the cylinder. The method includes where the controller disregards output of the sensor with regard to engine misfire when the controller is adjusting the compression ratio.

Referring now to FIG. 5, example engine operating ranges for applying different methods for detecting engine misfire are shown. The engine operating ranges shown in FIG. 5 may be applied in the method of FIG. 4.

FIG. 5 shows a plot of engine speed versus engine load. The vertical axis represents engine load and engine load increases in the direction of the vertical axis arrow. The horizontal axis represents engine speed and engine speed increases from the left side of the figure to the right side of the figure. Non-shaded region or area 502 is an engine operating region where engine crankshaft acceleration is the basis for judging the presence or absence of engine misfire. Force applied to an engine compression ratio adjusting linkage is not the basis for judging the presence or absence of engine misfire in region 502. Shaded region or area 504 is an engine operating region where force applied to an engine compression ratio adjusting linkage may be the basis for judging the presence or absence of engine misfire. Engine crankshaft acceleration is not the basis for judging the presence or absence of engine misfire in region 502 unless the engine compression ratio is changing while the engine is operating in this region.

A first engine speed threshold 522 is a lower engine speed below which engine misfire is not determined using force that may be applied to the engine compression ratio changing linkage. A second engine speed threshold 524 is a higher engine speed above which engine misfire is not determined using force that may be applied to the engine compression ratio changing linkage. A first engine load (e.g., engine air flow divided by a maximum theoretical maximum engine air flow) threshold 512 is a lower engine load below which engine misfire is not determined using force that may be applied to the engine compression ratio changing linkage. A second engine load threshold 510 is a higher engine load above which engine misfire is not determined using force that may be applied to the engine compression ratio changing linkage.

In other examples, two or more regions where force applied to the engine compression ratio changing linkage is the basis for judging the presence or absence of engine misfire may be provided. Further, the shape of engine operating regions need not be rectangular. Rather, the regions may be circular, elliptical, triangular, or free form. The engine operating regions may be based on torsional crankshaft vibration levels at the various engine speed and loads.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine operating method, comprising:
    adjusting an engine actuator via a controller in response to engine misfire indicated from an engine crankshaft position while operating an engine in a first operating region; and
    adjusting the engine actuator via the controller in response to engine misfire indicated from output of a sensor coupled to an engine compression ratio adjusting linkage while operating the engine in a second operating region, wherein the output of the sensor is within a predetermined crankshaft angular range, wherein engine misfire is determined via current supplied to a motor that adjusts the engine compression ratio adjusting linkage only when an engine compression ratio is not changing.

2. The method of claim 1, further comprising determining the engine misfire in response to a force measured via the sensor being greatest during a cylinder cycle within a predetermined crankshaft angle of top-dead-center compression stroke of a cylinder during the cylinder cycle, and where the predetermined crankshaft angle varies as a function of engine compression ratio.

3. The method of claim 1, where the first operating region includes engine load less than a first threshold engine load, and further comprising:
    operating the engine in the first operating region; and
    operating the engine in the second operating region, wherein
    engine misfire is determined via the sensor only when the compression ratio of the engine is not being adjusted.

4. The method of claim 1, where the first operating region includes engine load greater than a second threshold engine load.

5. The method of claim 1, further comprising adjusting the compression ratio of the engine via the engine compression ratio adjusting linkage and disregarding the output of the sensor for purposes of determining engine misfire while adjusting the compression ratio of the engine.

6. The method of claim 1, where the engine actuator is an ignition coil, and further comprising:
    adjusting spark energy provided via the ignition coil in response to engine misfire indicated from the engine crankshaft position and engine misfire indicated from the output of the sensor.

7. An engine operating method, comprising:
    adjusting a compression ratio of a cylinder via adjusting a position of a control linkage in response to output of a controller;
    receiving input from a sensor positioned along the control linkage to the controller or receiving a determination of an amount of electrical current supplied to a motor to maintain a position of an engine cylinder compression ratio changing linkage;
    adjusting an engine actuator responsive to engine misfire determined from output of the sensor when the controller is not adjusting the compression ratio and not adjusting the engine actuator responsive to output of the sensor when the controller is adjusting the compression ratio; and
    adjusting the engine actuator responsive to the output of the sensor, the output of the sensor within a predetermined crankshaft angular range, wherein engine misfire is determined via current supplied to the motor that adjusts the engine cylinder compression ratio changing linkage only when the engine compression ratio is not changing.

8. The method of claim 7, where the sensor is a strain gauge, and where the control linkage extends from the motor to an engine piston.

9. The method of claim 7, where the engine actuator is an ignition coil.

10. The method of claim 9, further comprising increasing spark energy via increasing a dwell time of the ignition coil.

11. The method of claim 7, further comprising determining a presence or absence of engine misfire via determining a crankshaft angle during a cylinder cycle where force applied to the control linkage is determined to be greatest based on operating conditions.

12. The method of claim 11, further comprising determining the presence of engine misfire in response to the crankshaft angle being within a predetermined crankshaft angle range of top-dead-center compression stroke of the cylinder, and wherein engine misfire is diagnosed responsive to crankshaft position while operating the engine in a low torsional vibration engine operating range and engine misfire is diagnosed responsive to force applied to the compression ratio changing linkage while operating the engine in a high torsional vibration engine operating range.

13. The method of claim 7, where the controller disregards the output of the sensor with regard to engine misfire when the controller is adjusting the compression ratio.

14. An engine operating method, comprising:
adjusting a compression ratio of a cylinder via adjusting a position of a control linkage in response to output of a controller;
receiving input from a sensor positioned along the control linkage to the controller or receiving a determination of an amount of electrical current supplied to a motor to maintain a position of an engine cylinder compression ratio changing linkage;
adjusting an engine actuator responsive to engine misfire determined from output of the sensor when the controller is not adjusting the compression ratio and not adjusting the engine actuator responsive to output of the sensor when the controller is adjusting the compression ratio;
determining a presence or absence of engine misfire via determining a crankshaft angle during a cylinder cycle where force applied to the control linkage is determined to be greatest based on operating conditions; and
determining the presence of engine misfire in response to the crankshaft angle being within a predetermined crankshaft angle range of top-dead-center compression stroke of the cylinder, and wherein engine misfire is diagnosed responsive to crankshaft position while operating an engine in a low torsional vibration engine operating range and engine misfire is diagnosed responsive to force applied to the compression ratio changing linkage while operating the engine in a high torsional vibration engine operating range.

15. The method of claim 14, further comprising increasing spark energy via increasing a dwell time of an ignition coil.

16. The method of claim 14, where the controller disregards the output of the sensor with regard to engine misfire when the controller is adjusting the compression ratio.

17. The method of claim 14, wherein engine misfire is determined only when the compression ratio is not changing.

18. The method of claim 14, wherein the engine misfire is determined via current supplied to the motor that adjusts the engine cylinder compression ratio changing linkage.

19. The method of claim 18, wherein engine misfire is determined via the sensor only when the compression ratio of the engine is not being adjusted.

* * * * *